Sept. 10, 1963 E. A. MEYER 3,103,265
MOULDING FASTENER
Filed Oct. 29, 1959 2 Sheets-Sheet 1

INVENTOR.
Engelbert A. Meyer
BY
L. D. Burch
ATTORNEY

Sept. 10, 1963 E. A. MEYER 3,103,265
MOULDING FASTENER
Filed Oct. 29, 1959 2 Sheets-Sheet 2

INVENTOR.
Engelbert A. Meyer
BY
L. D. Burch
ATTORNEY

United States Patent Office 3,103,265
Patented Sept. 10, 1963

3,103,265
MOULDING FASTENER
Engelbert A. Meyer, Detroit, Mich., assignor to General Motors Corporation, Detroit, Mich., a corporation of Delaware
Filed Oct. 29, 1959, Ser. No. 849,655
12 Claims. (Cl. 189—88)

This invention relates to fastener devices and more particularly to a fastener for securing a moulding strip over a pinchweld flange.

In the design and development of automobiles from year to year there are numerous styling changes that must be made, including changes in the shape of body panels and consequent changes in the shape and size of moulding strips. Changes of this nature also cause changes in design and construction of fasteners utilized to secure moulding strips to the vehicle body panels.

It is desirable in automotive manufacture to cover the joints between various body panels with a moulding strip of some configuration, to present an aesthetic appeal to the consumer and at the same time to protect the joint from the entrance of dirt and moisture which would damage the finish of the panel. Typical of the joints necessary to be covered is a pinchweld joint between a pair of body panels, in which each of the panels has a flange formed outwardly therefrom at approximately 90° and the two flanges abut each other where they may be welded or otherwise secured. This leaves a flange extending outwardly from the body panels all along the pinchweld joint. It is this flange that needs to be hidden by a moulding strip.

Fasteners utilized in the past for securing moulding strips over pinchweld flanges have been formed so that they may be slipped over the pinchweld flange and the moulding strip snapped thereon, creating fastening problems in that the retention is not positive and the moulding strip and the fastener may be jarred loose or pulled loose without too much resistance. This is extremely undesirable from the standpoint of the manufacturer and the automobile user.

The device in which this invention is embodied comprises, generally, a fastening clip which may be secured over and to the pinchweld flange by means of a machine screw or the like, and contacts the supporting panels adjacent the pinchweld flange on arcuate surfaces, the central portions of which engage the panels and the outer portions of which are spaced from the panels. This permits a moulding strip having inturned flanges to be slid under the arcuate portions and into the proper position over the pinchweld flange. When properly positioned, the central parts of the arcuate portions securely retain the moulding strip by clamping the moulding strip against the supporting panels. In order to keep the moulding strip from chipping or scratching the painted surface of the supporting panels and thus permitting rust to build up, a plastic spacer member may be placed between the fastener and the supporting panels such that the moulding strip will slide over the plastic spacer rather than directly on the supporting panels.

A device of this nature creates a positive retention of the moulding strip over the pinchweld flange and one that will not jar loose nor be easily removed. The moulding strip is securely held in place and thus prevented from vibrations and the like and the finish adjacent the moulding strip is protected from rust and from damage due to the moulding strip installation.

The device is suitable to a wide variety of moulding strip cross-sectional configurations, making it adaptable to styling changes in the motor vehicle body itself as well as to changes in the design of the moulding strip.

These and other advantages will become more apparent from the following description and drawings in which.

Figure 1:
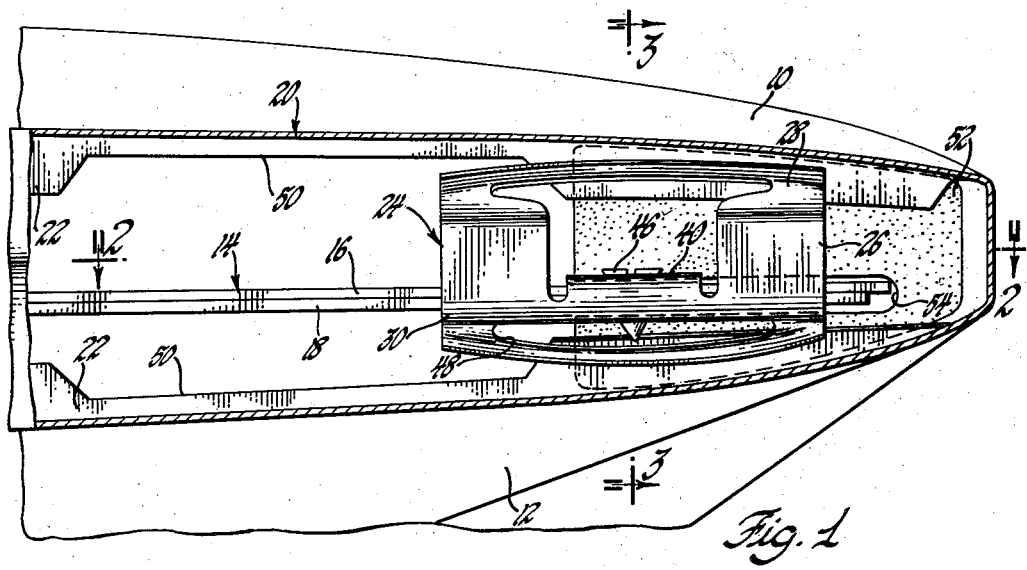
FIGURE 1 illustrates a portion of a motor vehicle with a pinchweld flange joining two panels and showing the fastener and moulding strip in their proper positions.
Figure 2:
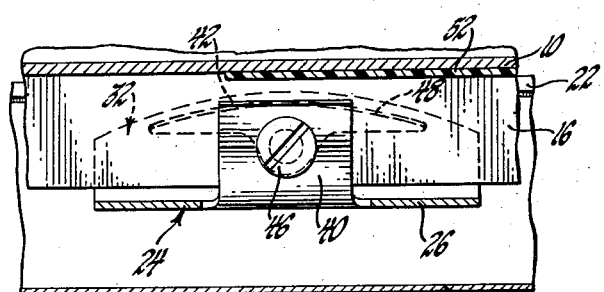
FIGURE 2 is a cross-sectional view of a portion of the motor vehicle set forth in FIGURE 1, taken substantially along the line 2—2 of FIGURE 1 and looking in the direction of the arrows, to illustrate the means for retaining the fastener on the pinchweld flange.

Referring more particularly to the drawings, the modification illustrated in FIGURES 1 through 4 will be first described. Referring to FIGURE 1, a body panel 10, such as the rear quarter outer panel, is joined to a second panel 12, which may be a separate panel altogether or a portion of the rear quarter outer panel. The manufacture of the quarter panel may require a pinchweld flange, illustrated generally by the numeral 14, joining two portions thereof. The pinchweld flange 14 is formed by turning outwardly a flange 16 on the upper panel 10 and turning outwardly a similar flange 18 on the lower panel 12. The two flanges 16 and 18 abut each other and are welded or otherwise joined, to provide a secure and tight joint.

Figure 3:
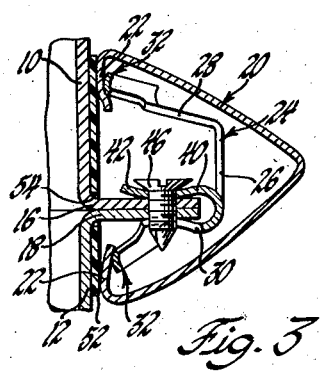
FIGURE 3 is a cross-sectional view of the fastener chrome strip and pinchweld flange, taken substantially along the line 3—3 of FIGURE 1 and looking in the direction of the arrows.
Figure 4:
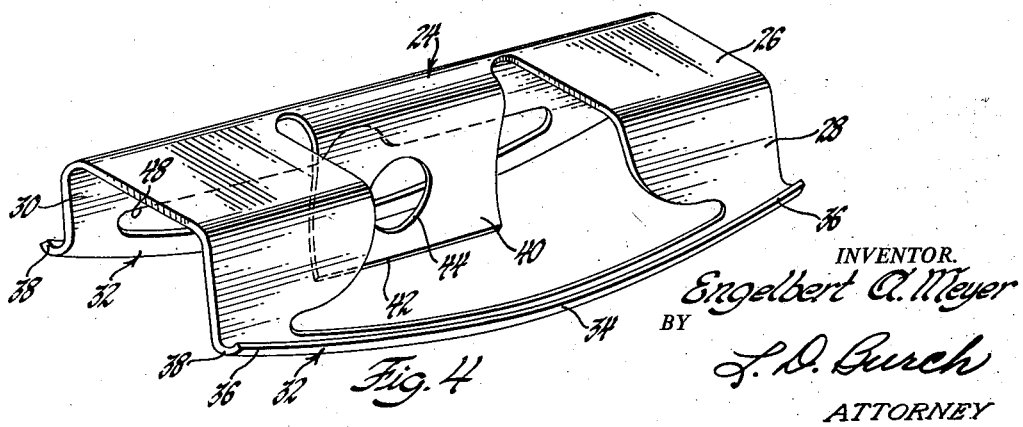
FIGURE 4 is a perspective view of the fastener device utilized in retaining the moulding strip on the pinchweld flange as illustrated in FIGURE 1.

A moulding strip 20 of generally U-shaped configuration or cross section, as illustrated in FIGURE 3, has a pair of inturned lips or flanges 22 which overlie the supporting panels 10 and 12 on opposite sides of the pinchweld flange 14. The moulding strip 20 is to be secured over the pinchweld flange 14 by a fastener, illustrated generally by the numeral 24.

The fastener 24 includes a body portion 26 which is generally planar, and is disposed over the pinchweld flange within the moulding strip 20. Side portions 28 and 30 are formed from the body portion 26, extending toward the supporting panels from the body portion 26 and terminating in arcuate portions, illustrated generally by the numerals 32, in the plane of the side members 28 and 30. The center 34 of the arcuate portion 32 is adapted to engage, or very nearly engage, the supporting panel 10 and the ends 36 of the arcuate portion 32 are spaced from the supporting panel 10. The arcuate portions 32 may be formed to include a U-shaped strengthening rib 38 which would be arcuate in a plane normal to the side members 28.

A tongue 40 is formed from the body portion 26 and extends downwardly and inwardly therefrom such that its free end 42 is disposed between the side members 28 and 30. The tongue 40 is adapted to slip over the pinchweld flange 14, as illustrated in FIGURE 3, to retain the fastener 24 on the pinchweld flange. An aperture 44 formed in the tongue 40 receives a machine screw or the like 46 which passes through the pinchweld flange 14 to secure the fastener thereon. An opening 48 formed in the side member 30 permits passage of the machine screw 46 therethrough on installation.

In the assembly of the moulding strip over the pinchweld flange the fastener 24 is first secured to the pinchweld flange 14 by the machine screw 46 and the moulding strip 20 placed over the fastener 24 such that the cutouts 50 in the lips 22 of the moulding strip 20 are disposed about the fastener 24. The moulding strip 20 is then slid inwardly such that the lips 22 of the moulding strip 20 ride underneath the upwardly spaced ends 36 of the arcuate portions 32 and under the central portion 34 of the arcuate portions 32, thus being secured in the proper position.

If it is desired to prevent the moulding strip from scratching or chipping the finished surface of the supporting panels 10 and 12, a plastic spacer member 52 may be disposed between the moulding strip and the panels 10 and 12. If a spacer 52 is used, the spacer is placed over the supporting panels that a slot 54 receives the pinchweld flange and allows the plastic spacer member to engage the supporting panels 10 and 12. The moulding strip 20 is then slid between the plastic spacer 52 and the arcuate portions 32 of the side members 28. Thus, there is no contact between the moulding strip 20 and the supporting panels 10.

A modification of the fastener device is illustrated in FIGURES 5 through 8. The supporting panels 10 and 12 are provided with a pinchweld flange, illustrated generally by the numeral 14, and a moulding strip, illustrated generally by the numeral 20, is placed thereover. The moulding strip has the usual lip or flanges 22 by which the moulding strip is retained against the panels 10 and 12.

Figure 7:
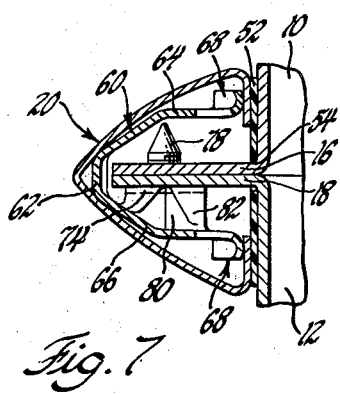
FIGURE 7 is a cross-sectional view of the moulding strip fastener and pinchweld flange as illustrated in FIGURE 5 taken substantially along the line 7—7 of FIGURE 5 and looking in the direction of the arrows.
Figure 8:
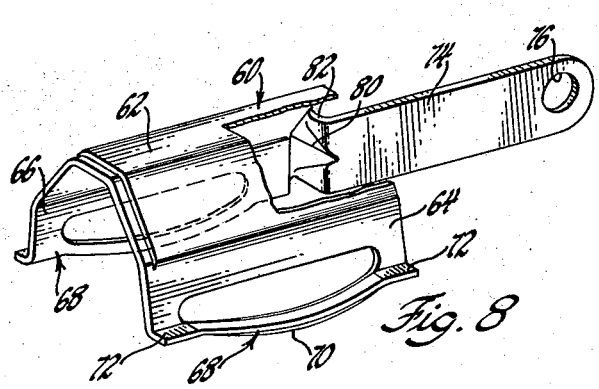
FIGURE 8 is a perspective view of the fastener modification illustrated in FIGURE 5.

The fastener device, illustrated generally by the numeral 60, includes a similar planar body portion 62 and similar side members 64 and 66. The side members extend from the body portions 62 toward the supporting panels 10 and 12, as best illustrated in FIGURE 7. The side members 64 and 66 terminate in arcuate portions, illustrated generally by the numeral 68, the portions being arcuate in the general plane of the side members 64. The central part 70 of the arcuate portion 68 is disposed closest to the supporting panels 10 and 12 and the ends 72 of the arcuate portion 68 are spaced from the supporting panels 10 and 12 to permit entry of the lips 22 of the moulding strip 20 on installation thereof.

Figure 5:
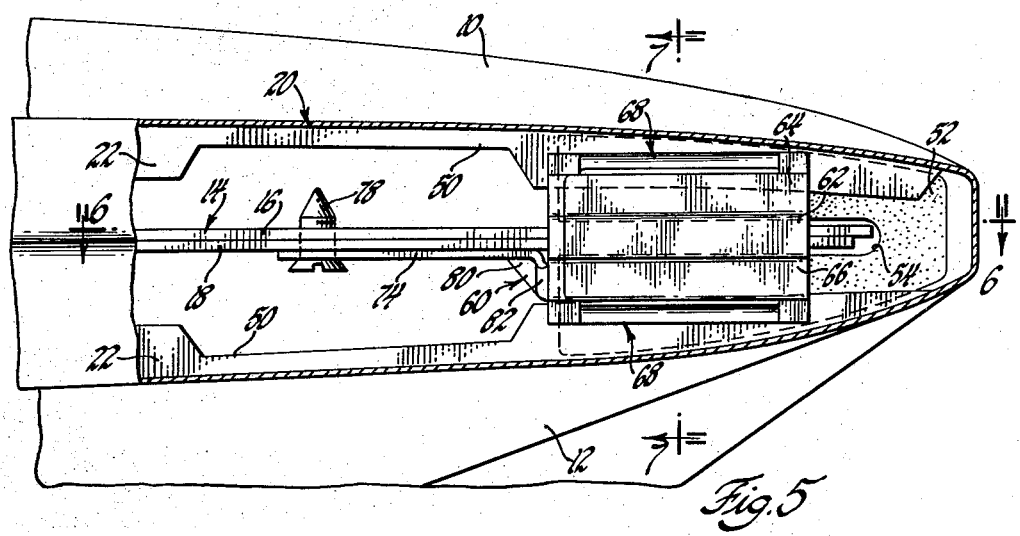
FIGURE 5 shows a portion of a motor vehicle having a pinchweld flange joining body panels and a modified form of the fastener device retaining a moulding strip over the pinchweld flange.
Figure 6:
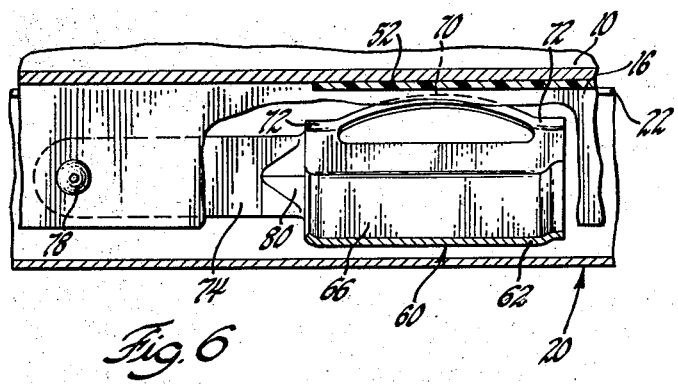
FIGURE 6 is a cross-sectional view of a portion of the structure set forth in FIGURE 5 taken substantially along the line 6—6 of FIGURE 5 and looking in the direction of the arrows.

A tongue 74 extends from the side member 66 and is bent to lie adjacent the pinchweld flange 14, as best illustrated in FIGURE 5. An aperture 76 receives a machine screw or the like 78 which secures the tongue 74 and the fastener 60 to the pinchweld flange 14. A strengthening rib 80 may be provided in the bent portion 82 of the tongue 74 if added strength is necessary.

The assembly of the moulding strip 20 over the pinchweld flange 14 is generally the same as that previously described. The fastener 60 is first secured to the pinchweld flange by the machine screw 78 and the moulding strip placed over the pinchweld flange and the fastener 60 such that the cutouts 50 in the lips 20 overlie the fastener 60. The moulding strip 20 is then slid inwardly such that the lips 22 pass between the rocker portions 68 and the supporting panels 10 and 12 and are retained thereon by the pressure of the central part 70 clamping the lips 22 to the supporting panels 10 and 12.

A similar plastic spacer member 52 may be provided to prevent damage to the surfaces of the body panels 10 and 12 if desired. When such plastic spacer is used, it is installed between the body panels 10 and 12 and the the arcuate portions 68 of the fastener 60 such that the moulding strip 20 may be slid therebetween on its installation.

Thus, it may be seen that a fastener device is provided for securing a moulding strip over a pinchweld flange in a positive manner and also a fastener device which is adaptable to a wide variety of usages.

What is claimed is:

1. Fastener means for securing a U-shaped moulding strip over a pinchweld flange on a supporting panel comprising a body portion receivable over said pinchweld flange and being substantially U-shaped in cross section, the sides of said body portion terminating in arcuate rocker portions to permit said moulding strip to be slid thereunder and between said rocker portions and said supporting panel, a tongue extending from said body and adapted to lie adjacent said pinchweld flange and having an aperture formed therein, and a machine screw adapted to be received through said aperture and said pinchweld flange to secure said body portion and said moulding strip to said pinch weld flange.

2. The fastener means set forth in claim 1 and further including plastic spacer means between said rocker portions and said supporting panel to prevent damage to said supporting panel when said moulding strip is slid therealong.

3. Fastener means for securing a U-shaped moulding strip over a pinchweld flange on a supporting panel and comprising a body receivable over said pinchweld flange, side members adapted to extend toward said supporting panel and on each side of said pinchweld flange, the terminal edges of said side members being arcuate in the plane of said side members and adapted to engage said supporting panel at the center thereof and having the ends spaced from said supporting panel, and means adapted to positively retain said body and side members on said pinchweld flange such that said moulding strip may be slid between said side members and said supporting panel for retention of said molding strip over said pinchweld flange.

4. The fastener means set forth in claim 3 and further including plastic spacer means receivable between said supporting panel and said side members to prevent damage to said supporting panel when said moulding strip is slid therealong.

5. Fastener means for securing a U-shaped moulding strip having inturned lips at the free edges thereof over a pinchweld flange on a supporting panel and comprising a flat body receivable over said pinchweld flange, side members extending substantially perpendicularly from said body and integral therewith, said side members adapted to extend toward said supporting panel and on opposite sides of said pinchweld flange, the terminal edges of said side members being arcuate in the plane of said side members and having the central portion thereof adapted to engage said supporting panel and the end portions thereof spaced from said supporting panel, and a tongue extending from one of said side members and adapted to be positively secured to said pinchweld flange for retaining said body and said side members on said pinchweld flange and to permit said moulding strip to be slid between said arcuate portions and said supporting panel and be secured thereby.

6. The fastener means set forth in claim 5 and further including plastic spacer means receivable between said supporting panel and said side members to prevent damage to said supporting panel when said moulding strip is slid therealong.

7. Fastener means for securing a U-shaped moulding strip having inturned lips at the free edges thereof over a pinchweld flange on a supporting panel and comprising a body adapted to be received over said pinchweld flange, side members extending substantially perpendicularly from said body and integral therewith, said side members adapted to extend toward said supporting panel and on opposite sides of said pinchweld flange, the terminal edges of said side members being arcuate in the plane of said side members and having the central portion thereof adapted to lie closely adjacent to said supporting panel and the end portions thereof spaced from said supporting panel, a tongue formed from one of said side members and adapted to lie closely adjacent to said pinchweld flange between said side members, and means adapted to secure said tongue to said pinchweld flange to retain said body and said side members thereon and permit said lips of said moulding strip to be slid between said arcuate portion and said supporting panel and retain said moulding strip over said pinchweld flange.

8. The fastener means set forth in claim 7 and further including plastic spacer means receivable between said supporting panel and said side members to prevent damage to said supporting panel when said moulding strip is slid therealong.

9. Fastener means for securing a U-shaped moulding strip having inturned lips at the free edges thereof over a pinchweld flange on a supporting panel and comprising a body receivable over said pinchweld flange, side members extending substantially perpendicularly from said body and integral therewith, said side members adapted to extend toward said supporting panel and on opposite sides of said pinchweld flange, the terminal edges of said side members being arcuate in the plane of said side members and having the central portion thereof adapted to lie closely adjacent said supporting panel and the end portions thereof spaced from said supporting panel, a tongue extending from one of said side members and adapted to lie closely adjacent said pinchweld flange exteriorly of said body and said side members, and means adapted to secure said tongue to said pinchweld flange to retain said body and said side members thereon and permit said lips of said moulding strip to be slid between said arcuate portion and said supporting panel and retain said moulding strip over said pinchweld flange.

10. The fastener means set forth in claim 9 and further including plastic spacer means receivable between said supporting panel and said side members to prevent damage to said supporting panel when said moulding strip is slid therealong.

11. Fastener means for securing a U-shaped moulding strip having inturned lips at the free edges thereof over a pinchweld flange on a supporting panel and comprising a body receivable over said pinchweld flange, side members extending substantially perpendicularly from said body and integral therewith, said side members adapted to extend toward said supporting panel and on opposite sides of said pinchweld flange, the terminal edges of said side members being arcuate in the plane of said side members and having the central portion thereof adapted to lie closely adjacent said supporting panel and the end portions thereof spaced from said supporting panel, a generally U-shaped tongue formed from one of said side members and adapted to extend over said pinchweld flange between said side members and lie closely adjacent said pinchweld flange, and means adapted to secure said tongue to said pinchweld flange and retain said body and said side members thereon and permit said lips of said moulding strip to be slid between said arcuate portion and said supporting panel and retain said moulding strip over said pinchweld flange.

12. The fastener means set forth in claim 11 and further including plastic spacer means receivable between said supporting panel and said side members to prevent damage to said supporting panel when said moulding strip is slid therealong.

References Cited in the file of this patent
UNITED STATES PATENTS

| | | |
|---|---|---|
| 2,184,249 | Churchill | Dec. 19, 1939 |
| 2,246,720 | Churchill | June 24, 1941 |
| 2,784,814 | Bright | Mar. 12, 1957 |
| 2,963,133 | MacCallum | Dec. 6, 1960 |